(12) United States Patent
Schafer et al.

(10) Patent No.: US 7,274,980 B1
(45) Date of Patent: *Sep. 25, 2007

(54) INTELLIGENT LIFT INTERLOCK SYSTEM

(75) Inventors: Gregory E. Schafer, Colfax, CA (US); Edward J. Prokopik, Colfax, CA (US)

(73) Assignee: Intermotive, Inc., Colfax, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/042,576

(22) Filed: Jan. 24, 2005

Related U.S. Application Data

(63) Continuation-in-part of application No. 10/613,336, filed on Jul. 3, 2003, now Pat. No. 6,965,819, which is a continuation of application No. 09/904,834, filed on Jul. 16, 2001, now Pat. No. 6,594,565.

(60) Provisional application No. 60/218,534, filed on Jul. 17, 2000.

(51) Int. Cl.
   A61G 3/00 (2006.01)
   A61G 3/06 (2006.01)
   B60P 1/44 (2006.01)

(52) U.S. Cl. .......................................... 701/36; 701/45
(58) Field of Classification Search .................. None
   See application file for complete search history.

(56) References Cited

U.S. PATENT DOCUMENTS

| | | | |
|---|---|---|---|
| 758,498 A | 3/1904 | Backlund et al. | |
| 2,530,341 A | 11/1950 | Satsky | |
| 3,516,559 A | 6/1970 | Walter | |
| 3,651,965 A | 3/1972 | Simonelli | |
| 3,847,297 A | 11/1974 | Baader et al. | |
| 4,026,387 A | 5/1977 | Abreu | |
| 4,027,807 A | 6/1977 | Thorley | |
| 4,039,091 A | 8/1977 | Adamski | |
| 4,071,152 A | 1/1978 | Kinkead et al. | |
| 4,121,695 A | 10/1978 | Carpenter | |
| 4,170,368 A | 10/1979 | Southward et al. | |
| 4,270,630 A | 6/1981 | Karkau | |
| 4,411,572 A | 10/1983 | Shearer et al. | |
| 4,420,286 A | * 12/1983 | Hanson et al. | ............... 414/539 |
| 4,466,771 A | 8/1984 | Thorley et al. | |

(Continued)

OTHER PUBLICATIONS

Transportation Research Board, National Research Council, Schiavone,J "Understanding And Applying Advanced On-Board Bus Electronics" pp. 25-45 1999 Washington, DC.

(Continued)

*Primary Examiner*—Michael J. Zanelli
(74) *Attorney, Agent, or Firm*—Theodore J. Bielen, Jr.

(57) ABSTRACT

A microprocessor controlled system for ensuring the safe operation of an auxiliary device, such as a wheelchair lift used in conjunction with a vehicle. The microprocessor preferably allows operation of the lift device when one or more parameters are met. These parameters include the following: the vehicle is in "park", the parking brake is engaged, the vehicle ignition is "on", the lift power switch is "on", and the lift door is open. The present invention does not allow the vehicle to be shifted out of park if the lift door is open and/or when the parking brake is "on".

16 Claims, 3 Drawing Sheets

U.S. PATENT DOCUMENTS

| | | | | |
|---|---|---|---|---|
| 4,479,753 | A | * | 10/1984 | Thorley ................. 414/541 |
| 4,493,603 | A | * | 1/1985 | Williams et al. ............ 414/541 |
| 4,768,610 | A | | 9/1988 | Pagel et al. |
| 4,804,308 | A | * | 2/1989 | Hamblin et al. ............ 414/540 |
| 4,892,014 | A | * | 1/1990 | Morell et al. ................. 477/92 |
| 5,052,879 | A | * | 10/1991 | Wolfe ......................... 414/541 |
| 5,158,419 | A | * | 10/1992 | Kempf et al. ............... 414/539 |
| 5,180,275 | A | | 1/1993 | Czech et al. |
| 5,205,697 | A | * | 4/1993 | Getty et al. ................. 414/341 |
| 5,228,538 | A | * | 7/1993 | Tremblay .................. 187/200 |
| 5,261,779 | A | | 11/1993 | Goodrich |
| 5,373,915 | A | * | 12/1994 | Tremblay .................. 187/201 |
| 5,533,594 | A | * | 7/1996 | Tremblay et al. ........... 187/201 |
| 5,614,883 | A | | 3/1997 | Dery et al. |
| 5,672,041 | A | * | 9/1997 | Ringdahl et al. ........... 414/545 |
| 6,053,693 | A | * | 4/2000 | Ringdahl et al. ........... 414/545 |
| 6,071,064 | A | | 6/2000 | Hackett |
| 6,122,682 | A | * | 9/2000 | Andrews ..................... 710/65 |
| 2006/0124375 | A1 | * | 6/2006 | Lahr et al. .................. 180/271 |

OTHER PUBLICATIONS

Transportation Research Board,Schiavone J. Understanding And Applying Advanced On-Board Bus Electronics, Overview pp. 1.1999 Washington DC.

St Microelectronics, Coen,P. "Can-Do Solutions For Car Multiplexing" pp. 1-16, 1998 US.

Color Graphics,Inc., Kaye,G "A Revolution in Progress" pp. 1-50, 1984 US.

McGraw-Hill Publications,Co Altman,L "Microprocessors" pp. 126 &127.,1975, New York, NY.

McGraw-Hill Publications,Co, Moore, A et al Microprocessor Applications Manual pp. 5-1, 1975 New York NY.

Scientific American,Noyce,R, "Microelectronics", pp. 65, 67, 160, 188&190,Sep. 1977, NewYork, NY.

Federal Transit Administration, "Guidline Spcifications For Passive Lifts,Active Lifts,Wheelchair Ramps And Secument Devices" pp. 1-End, 1992 US.

* cited by examiner

US 7,274,980 B1

INTELLIGENT LIFT INTERLOCK SYSTEM

CROSS-REFERENCES TO RELATED APPLICATIONS

The present application is a continuation-in-part of U.S. patent application Ser. No. 10/613,336, filed 3 Jul. 2003, now issued as U.S. Pat. No. 6,965,819 on 15 Nov. 2005; which is a continuation of U.S. patent application Ser. No. 09/904,834, filed 16 Jul. 2001, now issued as U.S. Pat. No. 6,594,565 on 15 Jul. 2003, which claims the benefit of the filing date of U.S. Provisional Patent Application 60/218,534, filed on 17 Jul. 2000.

FIELD OF THE INVENTION

The present invention is directed to a microprocessor-based system for use in a vehicle for controlling the operation of various auxiliary devices, such as wheelchair lifts, lift gates, personal lifts, or any other device that requires activation with the vehicle in a secure position.

BACKGROUND OF THE INVENTION

In the last several years, we have witnessed the increased use of various auxiliary lift devices, such as wheelchair lifts, lift gates and personal lifts, which are used to allow persons with disabilities or other infirmities to more easily enter and exit vehicles (such as buses, vans and sport utility vehicles (SUV's)). As can be appreciated, when such devices are used, it is important that the vehicle be prevented from moving during the operation of the auxiliary device, insofar as movement of the vehicle can result in injury to the user. Consequently, the Americans With Disabilities Act (ADA), Title 49, Code of Federal Regulations, has implemented various lift interlock requirements to ensure that vehicles will not operate when lift devices are employed.

U.S. Pat. No. 4,420,286, issued to Hanson et al., and U.S. Pat. No. 5,052,879, issued to Wolfe et al., acknowledge that an interlock device used in conjunction with a wheelchair lift, or an invalid lift, must or should be used. For example, Hanson et al. describes an invalid lift apparatus including an interlock switch 186. According to Hanson et al., after the driver brings the vehicle to a stop, the gear shift level must be placed in the "park" position to close the interlock switch 186 for the invalid lift apparatus to operate.

This patent, however, does not address the use of a parking brake or lift door input as parameters which are also helpful in ensuring that the vehicle will not operate while the lift apparatus is being used. In this respect, the Hanson et al. invention does not lock the vehicle into "park" when the lift door is open, nor when the parking brake is applied, nor does it incorporate system diagnostics and diagnostic displays.

The Wolfe et al. patent is directed to a wheelchair lift and transfer system, and references a "park" cutoff switch 4 (in FIG. 18). The Wolfe et al. system also does not lock the vehicle in "park" when the lift door is open or when the parking brake is employed, nor does the system incorporate system diagnostics and diagnostic displays.

BRIEF SUMMARY OF THE INVENTION

The deficiencies of the prior art are addressed by the present invention which is directed to an intelligent lift interlock system used to prevent a vehicle from being moved when an auxiliary device is operated. The auxiliary device used in the present system may include a wheelchair lift, a lift gate, a personal lift, or any other device that requires activation with the vehicle in a secure position. The present invention preferably provides the option of activating or deactivating an auxiliary device only when the vehicle is in "park". For instance, the system can be adapted so that an electrically-controlled front door can only de activated when the vehicle is in "park".

The present invention preferably includes a microprocessor controller for operating the auxiliary device based on transmitting the status of various sensors to the microprocessor. The lift interlock system, including the microprocessor, can be installed in the vehicle as original equipment or can be added at a later time. In this respect, the present invention is preferably designed to use sensors that are already on the vehicle by connecting them to OEM connectors for an easy "plug and play" installation. No cutting of OEM harnesses would be required. The present invention also preferably includes a module having diagnostic display and diagnostic capabilities, as well as a dedicated park output which can drive a relay, a lamp, a buzzer, or any other external device when the vehicle is in "park". In certain cases, the inputs to the microprocessor may be derived from a microprocessor found in the vehicle electrical system. Namely, such vehicle microprocessor capable of providing sensed signals indicating the position of the transmission gear selection device i.e. if such device is in the "park" position. In addition, vehicle microprocessor may sense and generate a signal indicating the position of the parking brake, or other parameters concerning the operational state of the vehicle.

Since the present invention is designed to prevent or reduce injuries associated with allowing various people with disabilities and/or infirmities to exit or enter the vehicle, the auxiliary device should only operate when all of the following conditions are met: 1) The vehicle is in park; 2) the parking brake is applied; 3) the vehicle's ignition is on; 4) the lift power switch is engaged; and 5) the lift door is open. Although the microprocessor utilized in the present invention can allow the operation of the lift device to be activated when one or fewer than all of the above-noted conditions are met, for safety reasons, the vehicle lift is preferably operated only when all of these conditions are met. Additionally, the present invention is preferably designed to prevent the vehicle from being shifted out of "park" if the lift door is open, or when the parking brake is applied.

Furthermore, the present invention preferably operates to prevent the vehicle from being shifted out of "park" whenever the parking brake is applied. This feature will eliminate excessive parking brake wear which can occur if the parking brake is inadvertently engaged while driving.

BRIEF DESCRIPTION OF THE SEVERAL VIEWS OF THE DRAWING

For a better understanding of the invention, reference is made to the following description taken in conjunction with the accompanying drawings, in which.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
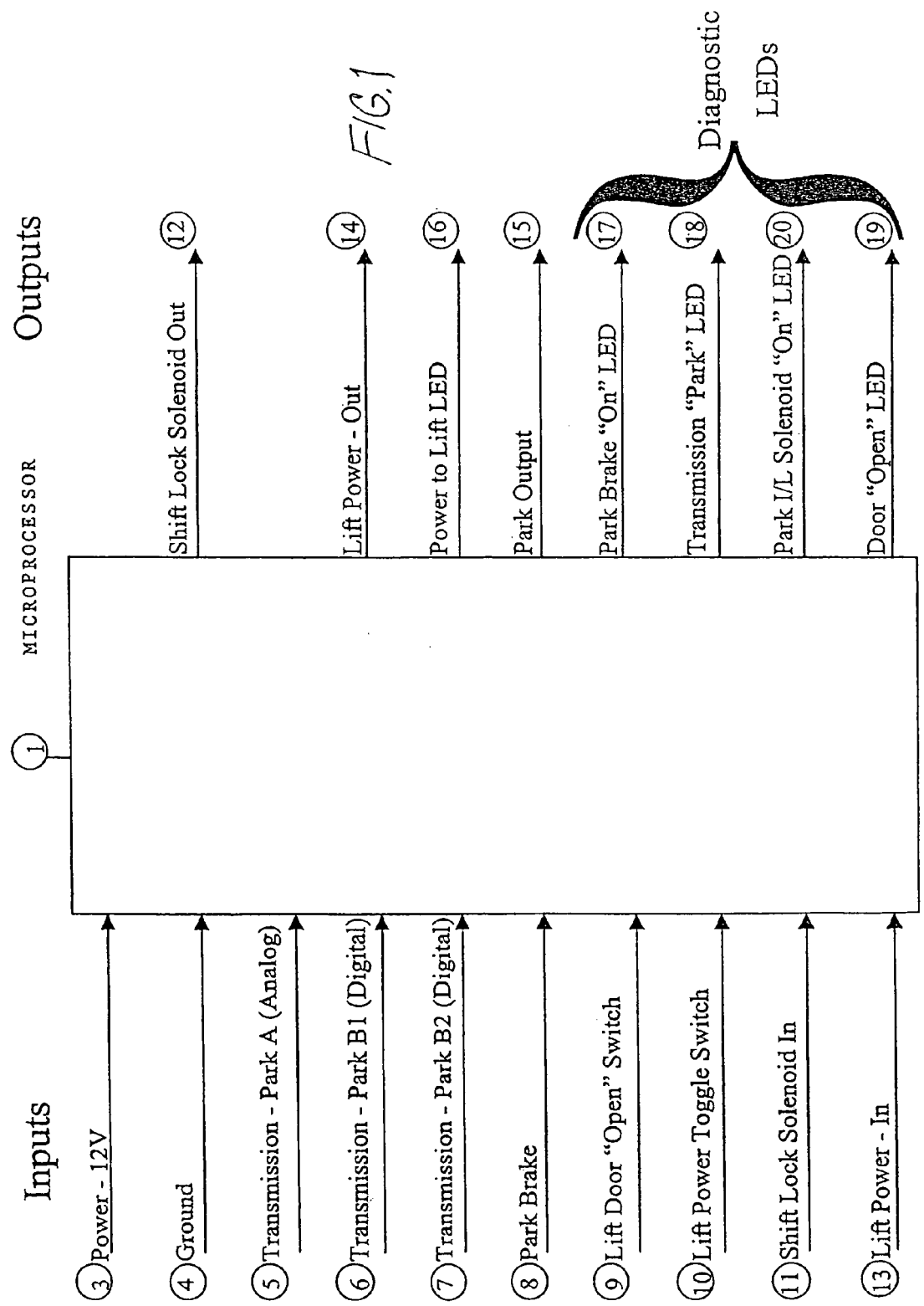
FIG. 1 is a block diagram of the present invention.

FIG. 1 illustrates the various inputs received by a microprocessor 1 as well as the various outputs transmitted from the microprocessor 1. Although various types of microprocessors can be utilized, the present invention preferably employs a microchip PIC 16c505 microprocessor. This particular microprocessor contains fourteen (14) available input or output pins utilized to practice the present invention. The input lines shown on the left hand side of FIG. 1 include a power line 3, a ground line 4, an analog transmission-park signal 5, two digital transmission-park signals 6, 7, a parking brake signal 8, a lift door "open" switch 9, a lift power toggle switch 10, a shift lock solenoid (in circuit 11), and a lift power-in circuit 13.

Various outputs are provided from the microprocessor 1 as shown on the right hand side of FIG. 1. These outputs include a shift lock solenoid output 12, a lift power output 14, a park output 15, a power to lift LED 16, and a plurality of diagnostics LEDs which provide output to a status display board 2 (see FIG. 2). These diagnostics LEDs include a parking brake "on" LED 17, a transmission "park" LED 18, a door "open" LED 19, a park interlock solenoid "on" LED 20 and, optionally, a power "on" LED.

Figure 2:
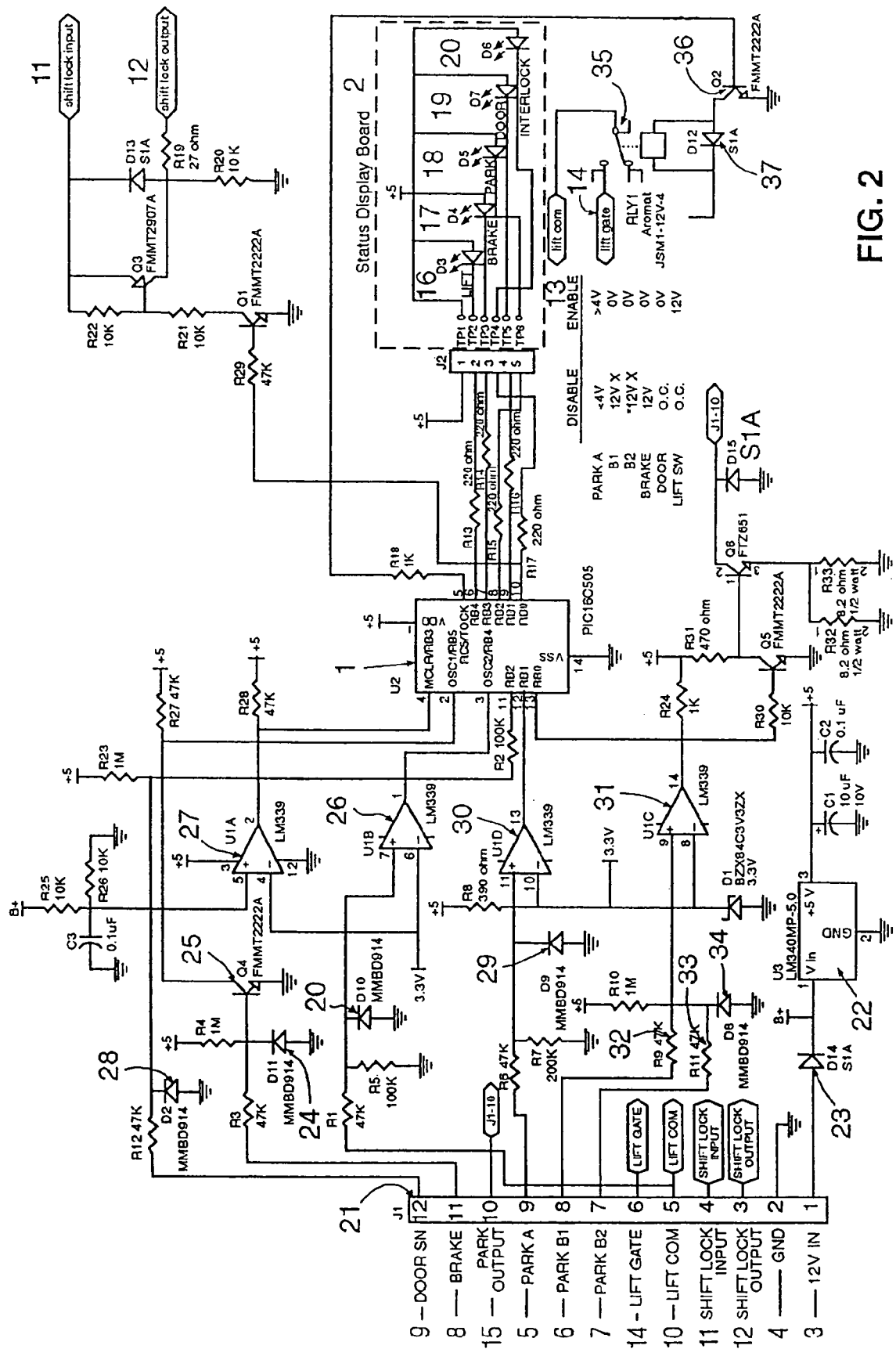
FIG. 2 is a circuit diagram of the microprocessor-controlled lift interlock module.

FIG. 2 shows a circuit diagram of the present invention including the reference numerals associated with the various inputs and outputs of microprocessor 1, as described above with respect to FIG. 1. As previously discussed, many of the sensors utilized by the present invention are directly connected to the microprocessor 1 utilizing, for example, an OEM connector 21. Power to operate the microprocessor controller is preferably provided by the vehicle's battery. A standard twelve volt battery can be connected through capacitors C1 and C2 to a step-down voltage regulator 22 for dropping the twelve volts to five volts. Capacitor C1 is preferably provided to buffer short power drops without circuit recess. A diode 23 is preferably used for reverse polarity protection. The five volts produced by the step-down regulator 22 are preferably provided to the microprocessor 1 at pin 1. This also preferably indicates that the ignition is on. Although it is indicated that a standard twelve volt power source is utilized, it is noted that the vehicle can be powered by other voltages sources, typically between eleven and fourteen volts, although voltages as high as sixteen volts are possible. Regardless of the source of the power, the step-down regulator 22 reduces the voltage to a manageable level, such as five volts, to be introduced to the microprocessor 1. A ground circuit is preferably included connected to pin 14 providing ground through the vehicle's chassis.

When the vehicle is stopped and the parking brake is applied, this information is preferably supplied to the microprocessor 1 through pin input 2. A twelve volt input supplied through the vehicle's battery preferably indicates that the brake has not been engaged, whereas a ground input preferably indicates that the brake has been engaged. If the brake input is not properly connected, a "not engaged" signal is preferably sent to pin 2 of the microprocessor 1 to prevent erroneous triggering. The brake 11 is preferably connected to the microprocessor 1 through a circuit including resistors, a signal diode 24, and a transistor used to isolate and protect the microprocessor 1 from input voltage spike and miswiring.

The lift interlock system of the present invention is preferably used to power a lift or similar device only when the vehicle is secured. The lift or similar device is preferably powered only when a particular switch, such as a toggle or other type of device, is engaged. This switch can be provided at any location in the vehicle, such as in proximity to the lift device, or on the vehicle's dashboard. The circuit provided between the lift power switch 10 and pin 3 of the microprocessor 1 preferably indicates that the lift power switch has been turned to the "on" position. A twelve volt input preferably indicates that the switch is on and a zero volt input preferably indicates that the switch is "off". Similar to the parking brake input, an open circuit also preferably indicates the "off" condition. The circuit preferably employs a number of resistors, a signal diode 25, as well as an operational amplifier 26 used to isolate and protect the microprocessor 1 from input voltage spikes or miswiring.

The operation of the microprocessor 1 is preferably protected through the pin 4 utilizing a brownout protection circuit. The circuit ensures the proper reset of the microprocessor 1 if the input voltage drops momentarily, such as to four volts. An operational amplifier 27 is used as a comparator for the four volt threshold. As can be appreciated, this threshold need not be four volts, but could also be slightly lower.

Since the present invention is primarily used to control the operation of a lift device in conjunction with a door of the vehicle, it is important to ensure that the door of the vehicle is open prior to engaging the lift device. Therefore, the circuit between the lift door 9 and pin 11 is preferably used to make this determination. A twelve volt input preferably indicates that the door is closed and a ground input preferably indicates that the door is open. If the input is not connected, the door closed signal is preferably not sent to prevent erroneous triggering. This circuit preferably employs a plurality of resistors and a signal diode 28 to isolate and protect the microprocessor 1 from input voltage spikes or miswiring.

The present invention is preferably adapted to be utilized with a multitude of vehicle types. These vehicles preferably contain transmission devices capable of indicating the position of the transmission device to a dashboard or similar display in the vehicle. Some vehicles can employ a single wire analog signal to indicate that he transmission is in "park", and other vehicles can employ a digital or a two-wire "park" signal. Other vehicles employ sensors, such as sensors 104 and 108 in conjunction with microprocessor 102, FIG. 3, which will be discussed in greater detail hereinafter. Therefore, the present invention has been designed to be employed by vehicles using an analog signal or a digital signal to indicate whether the transmission is in "park". The input to pin 12 of the microprocessor 1 is preferably connected to a circuit providing an analog signal from "park" input 5. If the vehicle is in park, a signal greater than four volts is preferably transmitted to the microprocessor 1. If the vehicle is not in "park", a signal less than four volts is preferably transmitted to the microprocessor 1. If no input is connected to pin 12, the microprocessor 1 preferably looks to pin 13 which is sued to connect the digital park inputs to the microprocessor 1. The circuitry between the analog signal and pin 12 preferably includes resistors, a signal diode 29, as well as an operational amplifier 30 used to isolate and protect the microprocessor 1 from input voltage spikes or miswiring. The operational amplifier 30 is also preferably used to determine the four volt threshold by being used as a comparator. Since operational amplifiers typically are provided in a quad configuration (4 per chip), the three other operation amplifiers shown in this circuit are preferably used for signal isolation in other input circuits.

Pin 13 of microprocessor 1 preferably receives a signal generated by a digital transmission park input. The signals produced by the two digital transmission park inputs are preferably monitored at a point between two series resistors, 32, 33. If both inputs are zero, the vehicle is in "park", and if either of the inputs are at twelve volts, the vehicle is not in "park". As was true with a number of the other circuits of the present invention, the present circuit includes a signal diode 34, as well as an operational amplifier 31 used to isolate and protect the microprocessor form input voltage spikes or miswiring. This circuit can also be used as a "park" output circuit. When the vehicle is in "park", it can preferably ground up to 500 milliamps of a load, such as a buzzer or lamp. This can be accomplished through a series of resistors and transistors. By slightly changing the circuit, the analog "park" transmission sensor can also be used to operate a load.

In this respect, the present invention can be adapted such that a circuit is provided to operate an auxiliary device, such as a front door, only when the vehicle is in the "park" position. When utilized with a digital park transmission sensor, pin 13 preferably receives a low (0V) signal through op-amp 31. This signal can also be transmitted to transistor 05. Since transistor 05 is an NPN transistor, the low signal preferably switches 05 off, and when this occurs, transistor 06 is preferably switched on. Transistor 06 is connected to pin 10 which in turn can be connected to an auxiliary device such as a door. When transistor 06 is on, it preferably converts the auxiliary device to ground through two 8.2 ohm resistors to prevent damage to the transistor 06 in the event it is directly shorted to power. Diode 15 is preferably used to protect against voltage spikes. Although the present invention has been described with respect to the digital park transmission sensor, it could also be operated if an analog sensor is employed.

Pins 6, 7, 8, 9, and 10 are preferably used to provide outputs from the microprocessor 1 to a status display board 2, provided on or close to the vehicle's dashboard. These signals are preferably used to indicate the status of various devices used in the lift interlock system. This system preferably operates only when the following conditions are met: The vehicle is in "park", the parking brake is engaged, the vehicle ignition is "on", the lift power switch is "on", and the lift door is open. Since the vehicle's battery provides power to the interlock, operating this system with the ignition on could lead to a low battery voltage condition, i.e., if the interlock system is operated for a long time while the vehicle is parked. Once the microprocessors recognizes the existence of all of these signals (or in some instances a combination of these signals), relay 35, via pin 5, is preferably engaged through transistor 36 and the lift or similar device preferably begins to operate. This circuit is preferably protected for inductive voltage spikes from the relay coil 35 by a diode 37. This switching system can be connected to either power or ground depending upon the type of switching desired by the user. If all of the parameters for the lift have been met, a lift power LED 16 is preferably illuminated using a five voltage supply and by grounding the circuit. A 220 ohm resistor is preferably used to limit the current to the LED.

LED 17 is preferably illuminated through pin 7 only when the parking brake is employed. As was true with respect to the lift power LED, this LED is applied with five volts by grounding the circuit, wherein the LED will illuminate, and preferably employs a 220 ohm resistor to limit the current to the LED 17.

LED 18 is preferably illuminated through pin 8 only when the vehicle is in "park". The LED 18 preferably supplied with five volts of power by rounding the circuit, wherein the LED will illuminate. Similar to the other circuits previously described, the 220 ohm resistor is preferably used to limit the current to the LED.

Pin 9 is preferably connected to LED 19 which illuminates only when the lift door is open. As was true with the previously described circuits, the LED is supplied with five volts of power and by grounding the circuit, the LED will be illuminated. Furthermore, a 220 ohm resistor is preferably used to limit the current to the LED.

The present invention will operate to prevent the vehicle being shifted out of "park" if the lift door is open or if the parking brake is "on". Presently, the majority of vehicles on the road are provided with a solenoid for locking the shift mechanism in the "park" position until the driver steps on the brake petal. The microprocessor 1 preferably intercepts that signal and opens and closes the circuit to the solenoid output circuit. Connecting this circuit to the solenoid output circuit allows the vehicle to be shifted out of "park". If, however, the lift door is open or the parking brake is applied, this circuit will preferably be open and diverted to ground. If the vehicle does not have such a solenoid, it can be added.

Pin 10 is preferably connected to both this shift lock solenoid and a shift lock LED 20. The output circuit, including LED 20, is preferably grounded if the vehicle's lift door is in the open position and/or the parking brake is engaged. As was true with the previously described circuits, the LED is preferably supplied with five volts of power and by grounding the circuit, wherein the LED will illuminate. A 220 ohm resistor is preferably used to limit the current to the LED. This circuit also preferably locks the vehicle's brake shift interlock so that the vehicle cannot be shifted out of "park". This can be accomplished through a series of resistors and transistors.

As can be appreciated, the signal lights 16, 17, 18, 19, and 20 have been described as being LEDs. It can be appreciated that this type of signal indication can be varied as well as the colors produced by the illumination devices. The microprocessor of the present invention can perform self-diagnostics every time the vehicle is started. This is true since each of the aforementioned LEDs will be momentarily illuminated when the vehicle's ignition is initially turned on. The LEDs would then be turned off at a predetermined time after the initial engagement, such as one second. The use of the dash mounted LED panel displays could also be utilized as a device for diagnosing problems of the present invention.

Figure 3:
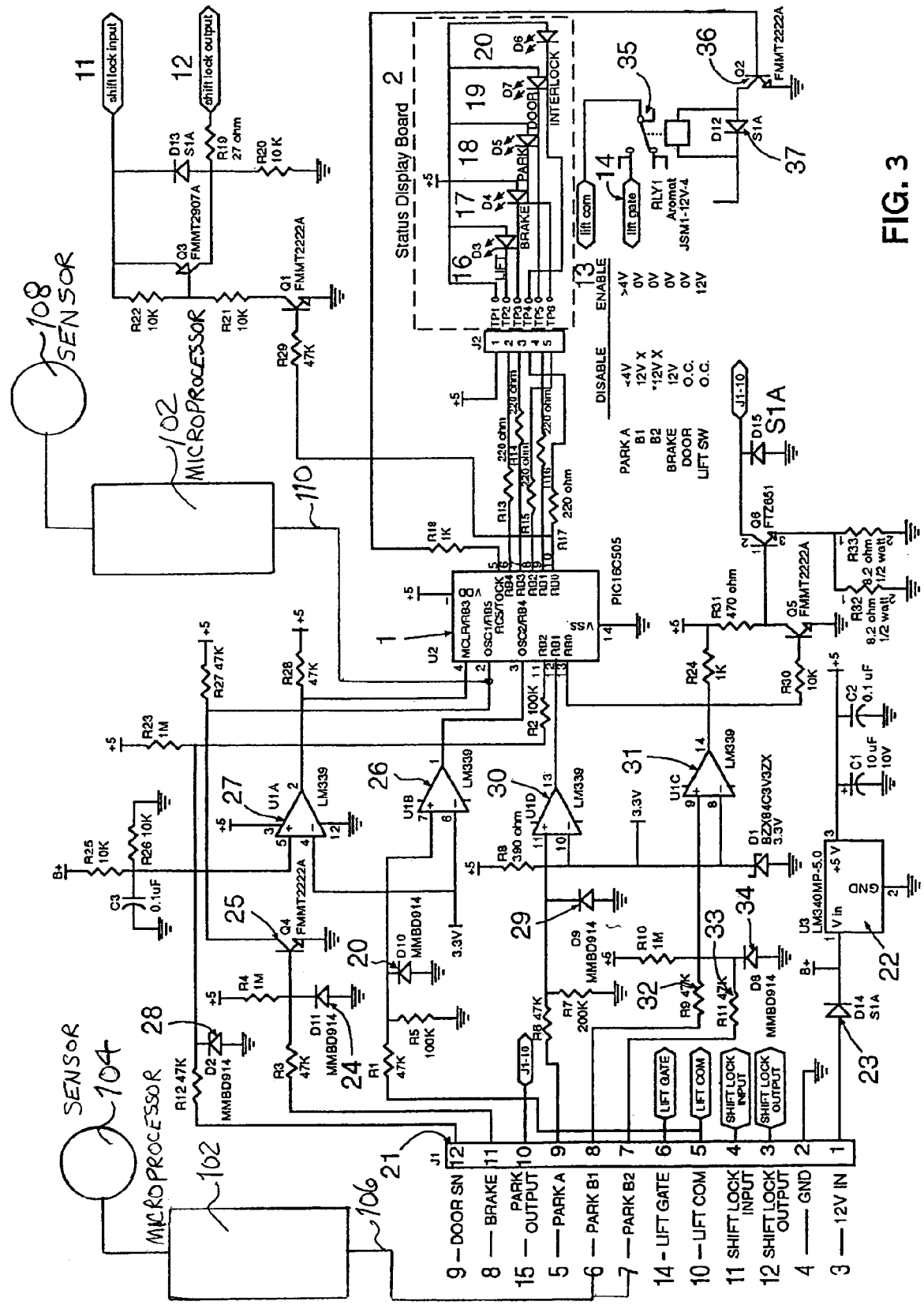
FIG. 3 is a schematic diagram of the microprocessor controlled interlock circuit in which the vehicle electrical system provides signals deriving from a vehicle microprocessor.

Referring now to FIG. 3, it may be understood that an alternate embodiment of the invention is shown in which microprocessor 102 is provided by the electrical system of the vehicle associated with the auxiliary device, such as a lift or the like. Sensor 104 detects the position of the transmission gear selection device and generates a signal 106 which is fed to either pin 6 or pin 7, since such signal is a digital signal. In addition, sensor 108 feeds microprocessor 102 (duplicated on FIG. 3) and optionally generates a signal 110 indicating the position of the parking brake. Signals 106 and 110 are used in the system depicted on FIG. 2 with microprocessor 1 to provide an interlock circuit for employment in a vehicle to prevent the operation of the vehicle when an auxiliary device is turned on or is in an operational state.

It will this be seen that the objects set forth above, among those made apparent from the preceding description, are additionally attained, and, since certain changes may be made to carry out the above process, and in the construction set forth, without departing from the spirit and scope of the invention, it is intended that all matter contained in the above description and shown in the accompanying drawing shall be interpreted as illustrative and not as limitation.

It is also to be understood that the following claims are intended to cover all of the generic and specific features of the invention herein described and all statements of the scope of the invention which, is a matter of language, might be set to fall therebetween.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An interlock circuit for use in a vehicle having an on-board power supply, a transmission gear selection device, and one microprocessor providing a transmission gear signal indicating when the transmission gear selection device is in a certain position, to prevent the operation of the vehicle when an auxiliary device is turned on or is in an operational state,
   comprising:
   a. a auxiliary sensor for generating an auxiliary device signal indicating when the auxiliary device is turned on or is in an operational state; and
   b. another microprocessor for receiving said transmission gear signal from the one microprocessor and said auxiliary device signal from said auxiliary device sensor.

2. The interlock circuit of claim 1 which further comprises a circuit for operating said another microprocessor through the vehicle power supply, said circuit including a step-down voltage regulator connected between said another microprocessor and said power supply.

3. The interlock circuit of claim 1 which further comprises a filter circuit provided between said auxiliary device sensor and said another microprocessor for isolating said another microprocessor from a voltage spike.

4. The interlock circuit of claim 1 in which said one microprocessor further receives a parking brake signal indicating the position of the parking brake and provides said parking brake signal indicating the position of the parking brake to said another microprocessor.

5. The interlock circuit of claim 4 further comprising a filter circuit provided between each of said auxiliary device and parking brake sensor and said another microprocessor for isolating said another microprocessor from a voltage spike.

6. An interlock circuit for use in a vehicle having an on-board power supply, a transmission gear selection device, and one microprocessor for providing a transmission gear signal indicating when the transmission gear selection device is in a certain position, and an auxiliary device, the interlock circuit being provided to prevent the operation of the vehicle when the auxiliary device is in a pre-selected operational state, the circuit comprising:
   a. an auxiliary device sensor for generating an auxiliary device signal indicating when the auxiliary device is in a pre-selected operational state; and
   b. another microprocessor receiving said auxiliary device signal wherein the circuit is adapted to prevent the transmission device gear selection device from being shifted when the auxiliary device is in the preselected operational state.

7. An interlock circuit for use in a vehicle having an on-board power supply, a transmission gear selection device, and a microprocessor providing a transmission gear signal indicating when the transmission gear selection device is in a certain position, to prevent the operation of the vehicle when an auxiliary device is turned on or is in an operational state,
   comprising:
   a. a auxiliary sensor for generating an auxiliary device signal indicating when the auxiliary device is turned on or is in an operational state; and
   b. an integrated circuit for receiving said transmission gear signal from the microprocessor and said auxiliary device signal from said auxiliary device sensor.

8. The interlock circuit of claim 7 which further comprises a circuit for operating said integrated circuit through the vehicle's power supply, said circuit including a step-down voltage regulator connected between said integrated circuit and said power supply.

9. The interlock circuit of claim 7 which further comprises a filter circuit provided between said auxiliary device sensor and said integrated circuit, said filter circuit isolating said integrated circuit from a voltage spike.

10. The interlock circuit of claim 7 in which microprocessor further receives a parking brake signal indicating the position of the parking brake and provides said parking brake signal indicating the position of the parking brake to said integrated circuit.

11. The interlock circuit of claim 10 further comprising a filter circuit provided between each of said auxiliary device and parking brake sensor and said integrated circuit, for isolating said integrated circuit from a voltage spike.

12. An interlock circuit for use in a vehicle having an on-board power supply a transmission gear selection device, and a microprocessor providing a transmission gear signal indicating when the transmission gear selection device is in a certain position, to prevent the operation of the vehicle when an auxiliary device is turned on or is in an operational state,
   comprising:
   a. a auxiliary sensor for generating an auxiliary device signal indicating when the auxiliary device is turned on or is in an operational state; and
   b. an operations controller for receiving said transmission gear signal from the microprocessor and said auxiliary device signal from said auxiliary device sensor.

13. The interlock circuit of claim 12 which further comprises a circuit for operating said operations controller through the vehicle's power supply, said circuit including a step-down voltage regulator connected between said operations controller and said power supply.

14. The interlock circuit of claim 12 which further comprises a filter circuit provided between said auxiliary device sensor and said operations controller for isolating said operations controller from a voltage spike.

15. The interlock circuit of claim 12 in which said one microprocessor further receives parking brake signal indicating the position of the parking brake, and provides said parking brake signal indicating the position of the parking brake to said operations controller.

16. The interlock circuit of claim 15 further comprising a filter circuit provided between each of said auxiliary device and parking brake sensor and said operations controller for isolating said operations controller from a voltage spike.

* * * * *